United States Patent
Ma et al.

(10) Patent No.: US 10,566,654 B2
(45) Date of Patent: Feb. 18, 2020

(54) ELECTROLYTE MATERIAL HAVING A NASICON STRUCTURE FOR SOLID-STATE SODIUM ION BATTERIES AND METHOD FOR THE PRODUCTION THEREOF

(71) Applicant: Forschungszentrum Juelich GmbH, Juelich (DE)

(72) Inventors: Qianli Ma, Juelich (DE); Frank Tietz, Monschau (DE); Sahir Naqash, Juelich (DE); Olivier Guillon, Juelich (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 78 days.

(21) Appl. No.: 15/758,345

(22) PCT Filed: Aug. 27, 2016

(86) PCT No.: PCT/DE2016/000332
§ 371 (c)(1),
(2) Date: Mar. 8, 2018

(87) PCT Pub. No.: WO2017/059838
PCT Pub. Date: Apr. 13, 2017

(65) Prior Publication Data
US 2018/0254521 A1     Sep. 6, 2018

(30) Foreign Application Priority Data
Oct. 9, 2015 (DE) .......... 10 2015 013 155

(51) Int. Cl.
*H01M 10/0562* (2010.01)
*C01B 33/32* (2006.01)
(Continued)

(52) U.S. Cl.
CPC ......... *H01M 10/0562* (2013.01); *C01B 25/26* (2013.01); *C01B 33/32* (2013.01);
(Continued)

(58) Field of Classification Search
CPC ......... H01M 10/0562; H01M 10/0585; H01M 10/054; H01M 2300/0068; C01B 25/26; C01B 33/32
See application file for complete search history.

(56) References Cited

U.S. PATENT DOCUMENTS

| | | |
|---|---|---|
| 3,330,697 A | 7/1967 | Pechini |
| 2010/0297537 A1 | 11/2010 | Coors et al. |

(Continued)

FOREIGN PATENT DOCUMENTS

WO   WO 2014052439 A1   4/2014

OTHER PUBLICATIONS

Carlos Bernuy-Lopez, et al., "Atmosphere Controlled Processing of Ga-Substituted Garnets for High Li-Ion Conductivity Ceramics", Chem. Mater. vol. 26, pp. 3610-3617, May 23, 2014.
(Continued)

*Primary Examiner* — Stewart A Fraser
(74) *Attorney, Agent, or Firm* — Leydig, Voit & Mayer, Ltd.

(57) ABSTRACT

A method for preparing electrolyte material having a NASICON structure, based on a $Na_{3+x}Sc_xZr_{2-x}(SiO_4)_2(PO_4)$ compound where $0 \leq x < 2$. The method includes providing an acidic, aqueous solution which, according to a desired stoichiometry, comprises sodium, scandium and zirconium in the form of water-soluble nitrates, acetates or carbonates, and soluble silicates or orthosilicic acids or organic silicon compounds in dissolved form; subsequently adding phosphoric acid or ammonium dihydrogenphosphate or other soluble phosphates, according to the desired stoichiometry, complex zirconium dioxide phosphates forming as colloidal precipitations; and subsequently drying and calcining the mixture.

13 Claims, 2 Drawing Sheets

(51) Int. Cl.
| | |
|---|---|
| H01M 10/054 | (2010.01) |
| H01M 10/0585 | (2010.01) |
| C04B 35/447 | (2006.01) |
| C04B 35/16 | (2006.01) |
| H01B 1/06 | (2006.01) |
| C01B 25/26 | (2006.01) |
| C04B 35/626 | (2006.01) |
| C04B 35/645 | (2006.01) |

(52) U.S. Cl.
CPC ............ *C04B 35/16* (2013.01); *C04B 35/447* (2013.01); *C04B 35/62645* (2013.01); *C04B 35/645* (2013.01); *H01B 1/06* (2013.01); *H01M 10/054* (2013.01); *H01M 10/0585* (2013.01); *C04B 2235/3201* (2013.01); *C04B 2235/3224* (2013.01); *C04B 2235/3244* (2013.01); *C04B 2235/3418* (2013.01); *C04B 2235/442* (2013.01); *C04B 2235/443* (2013.01); *C04B 2235/447* (2013.01); *C04B 2235/449* (2013.01); *C04B 2235/483* (2013.01); *C04B 2235/604* (2013.01); *C04B 2235/77* (2013.01); *H01M 2300/0068* (2013.01)

(56) References Cited

U.S. PATENT DOCUMENTS

| | | | |
|---|---|---|---|
| 2014/0197351 A1 | 7/2014 | Balagopal et al. | |
| 2015/0099188 A1 | 4/2015 | Holme et al. | |
| 2015/0364787 A1* | 12/2015 | Zhang | H01M 10/0562 429/321 |

OTHER PUBLICATIONS

E.M. Vogel, et al., "$Na^+$ Conductivity and Crystallographic Cell Characterization in the Hf-Nasicon System $Na_{1+x}Hf_2Si_xP_{3-x}O_{12}$", Solid State Ionics 14, pp. 1-6, Dec. 1984.

H. Y-P. Hong, et al., "Crystal Structures and Crystal Chemistry in the System $Na_{1+x}Zr_2Si_xP_{3-x}O_{12}$", Mat. Res. Bull. vol. 11, pp. 173-182, Dec. 1976.

A. Ignaszak, et al., "Synthesis and properties of Nasicon-type materials", Thermochimica Acta 426, pp. 7-14, Aug. 19, 2004.

Jie Fu, "Superionic conductivity of glass-ceramics in the system $Li_2O$—$Al_2O_3$—$TiO$—$P_2O_5$", Solid State Ionics 96, pp. 195-200, Dec. 1997.

J. L. Briant, et al., "Ionic Conductivity in $Na^+$, $K^+$, and $Ag^+$ β"-Alumina", Journal of Solid State Chemistry 33, pp. 385-390, Dec. 1980.

Jeffrey W. Fergus, "Ion transport in sodium ion conducting solid electrolytes", Solid State Ionics 227, pp. 102-112, Dec. 2012.

Noriaki Kamaya, et al., "A lithium superionic conductor", Nature Materials 10, pp. 682-686, Jul. 31, 2011.

M. A. Subramanian, et al., "The Preparation, Structure and Conductivity of Scandium-Substituted NASICONs", Journal of Solid State Chemistry 60, pp. 172-181, Dec. 1985.

Youichi Shimizu, et al., "Sol-gel sysnthesis of NASICON discs from aqueous solution", J. Mater. Chem. vol. 7, No. 8, pp. 1487-1490, Dec. 1997.

Ph. Colomban, "Relations conductivité/ microstructure dans des céramiques composites superconducteur (NASICON)/verre isolant", Revue de Physique Appliquee, vol. 22, No. 8, pp. 719-727, Dec. 1987.

A. B. Yaroslavtsev, et al., "Complex Phosphates with the NASICON Structure ($M_xA_2(PO_4)_3$)", Russian Journal of Inorganic Chemistry, vol. 51, suppl. 1, pp. 97-116, Dec. 2006.

Ji-Sun Lee, et al., "Spark Plasma Sintering (SPS) of NASICON Ceramics", J. Am. Ceram. Soc. vol. 87, No. 2, pp. 305-307, Dec. 2004.

Jin-Ho Choy, et al., "Physico-Chemical Characterization of NaaZraSiaPO12 Fine Powders Prepared by Sol-Gel Method Using Citrates", Jpn. J. Appl. Phys. vol. 32, part 1, No. 3A, pp. 1154-1159, Mar. 1993.

Adam G. Jolley, et al., "Improving the ionic conductivity of NASICON through aliovalent cation substitution of $Na_3Zr_2Si_2PO_{12}$", Ionics 21, pp. 3031-3038, Dec. 2015.

Yuria Saito, et al., "Ionic conductivity of NASICON-type conductors $Na_{1.5}M_{0.5}Zr_{1.5}(PO_4)_3$ ($M: Al^{3+}$, $Ga^{3+}$, $Cr^{3+}$, $Sc^{3+}$, $Fe^{3+}$, $In^{3+}$, $Yb^{3+}$, $Y^{3+}$)", Solid State Ionics 58, pp. 327-331, Dec. 1992.

E A Ukshe et al., "Influence of the geometric capacitance on the high-frequency impedance of electrochemical solid-electrolyte cells", ELEKTROHIMIA, vol. 25, No. 7, pp. 1012-1015 Jul. 1, 1989.

International Search Report of PCT/DE2016/000332, pp. 1-5, dated Aug. 12, 2016.

* cited by examiner

ELECTROLYTE MATERIAL HAVING A NASICON STRUCTURE FOR SOLID-STATE SODIUM ION BATTERIES AND METHOD FOR THE PRODUCTION THEREOF

CROSS REFERENCE TO RELATED APPLICATIONS

This application is a U.S. National Phase application under 35 U.S.C. § 371 of International Application No. PCT/DE2016/000332 (WO 2017/059838 A1), filed on Aug. 27, 2016, and claims benefit to German Patent Application No. DE 10 2015 013 155.9, filed Oct. 9, 2015.

FIELD

The present invention relates to an electrolyte material having a NASICON structure for solid-state sodium ion batteries and a method for the production thereof. The invention also relates to new electrolyte materials, in particular electrolyte materials as a solid-state electrolyte for sodium batteries, which materials have a high ionic conductivity, in particular a high Na ion conductivity. The invention further relates to the preparation of the above-mentioned electrolyte materials.

BACKGROUND

In contrast with conventional batteries which comprise a flammable, organic liquid electrolyte, solid-state batteries comprise a solid-state electrolyte.

Said solid-state batteries are far lower risk in the event of freezing or heating, and can therefore generally be used in a significantly larger temperature range.

Due to the safety advantages thereof, in particular with respect to possible applications in larger assemblies, such as in battery-operated vehicles or as storage units for renewable energy sources, interest in said solid-state batteries has been increasing in recent years.

Although the developments are not comparable with those of lithium batteries, all sodium solid-state electrolyte batteries could nonetheless be a realistic alternative, since, in contrast with lithium, sodium, as a raw material, is available in larger quantities and is significantly cheaper.

This alone is of great interest for storing renewable energy, such as solar or wind energy, since a huge requirement therefor is predicted.

The ß/ß"-aluminates, which are already commercially available as well developed conductors of sodium ions, are among the possible options for sodium ion-conducting solid-state electrolytes.

However, the 2-dimensional ionic conductivity, and handling difficulties, result in some problems in preparation and practical application.

Partially substituted $Na_3Zr_2(SiO_4)_2(PO_4)$ ceramics are known as other options for sodium ion-conducting solid-state electrolytes that do not have the above-mentioned disadvantages, which ceramics are suitable for use as sodium ion-conducting solid-state electrolytes in solid-state sodium batteries.

$Na_{1+x}Zr_2(SiO_4)_x(PO_4)_{3-x}$ was discovered 40 years ago.

All modifications crystallize into a hexagonal rhombohedral structure (space group R3c), apart from in the range of $1.8 \leq x \leq 2.2$, where, at room temperature, a disruption was identified in the monolithic space group C2/c.

On account of the high sodium ion conductivity thereof, these configurations are also known as NASICON (sodium (Na) Super ionic CONductor).

These systems typically reach their highest ionic conductivity when x=2 to 2.5.

Compounds having a NASICON structure are generally not electronically conductive.

In the $Na_3Zr_2(SiO_4)_2(PO_4)$ structure, partial substitution of the $Zr^{4+}$ cation by a trivalent metal cation $M^{3+}$, such as $Al^{3+}$, $Sc^{3+}$ or $Y^{3+}$, results in a deficit of positive charge which is compensated by adding further $Na^+$ ions and, overall, often leads to a higher conductivity.

One of the main problems of the materials based on $Na_3Zr_2(SiO_4)_2(PO_4)$ is the fact that the conductivity thereof is not sufficiently high compared with that of ß/ß"-aluminates.

While monocrystalline ß/ß"-aluminates have a conductivity of over $1 \cdot 10^{-2}$ S/cm at room temperature, the conductivity of materials based on $Na_3Zr_2(SiO_4)_2(PO_4)$ is usually in the range of from $1 \cdot 10^{-4}$ to $1 \cdot 10^{-3}$ S/cm at room temperature.

However, direct use of monocrystalline ß/ß"-aluminates appears unlikely.

However, at room temperature the conductivities of polycrystalline ß/ß"-aluminates are in the range of from $1 \cdot 10^{-3}$ to $2 \cdot 10^{-3}$ S/cm and thus still above those of materials based on $Na_3Zr_2(SiO_4)_2(PO_4)$.

Although, in the materials based on $Na_3Zr_2(SiO_4)_2(PO_4)$, sodium ions are advantageously transported in all three spatial directions, in contrast with the 2-dimensional conductivity of the ß/ß"-aluminates, and, at approximately 1250° C., the process temperatures of materials based on $Na_3Zr_2(SiO_4)_2(PO_4)$ are much lower than those of ß/ß"-aluminates, the large difference in the conductivities has, up to now, prevented the commercialization of the materials based on $Na_3Zr_2(SiO_4)_2(PO_4)$.

WO 2014/052439 A1 discloses a very high conductivity of $1.9 \cdot 10^{-3}$ S/cm at room temperature (25° C.) for $Na_4AlZr(SiO_4)_2(PO_4)$.

US 2010/0297537 A1 discloses an even higher conductivity of $3 \cdot 10^{-3}$ S/cm at 20° C. for a substituted $Na_{1+x}Zr_2(SiO_4)_x(PO_4)_{3-x}$.

However, no further information regarding the composition is described here.

However, these last-mentioned conductivities are in the range of ß/ß"-aluminates and therefore again show the potential of materials based on $Na_3Zr_2(SiO_4)_2(PO_4)$.

Up to now, materials based on $Na_3Zr_2(SiO_4)_2(PO_4)$ have been prepared by means of conventional solid-state reactions.

In this case, corresponding starting powders having a particle size of greater than 1 µm are generally used for mixing and grinding.

The powder obtained following the solid-state reaction typically has a relatively large grain size, for example in the range of from 1 to 10 µm, and, disadvantageously, has some inhomogeneities and impurities.

WO 2014/052439 A1, for example, discloses a solid-state electrolyte composite comprising $Na_{3+x}M_xZr_{2-x}Si_2PO_{12}$ where $A=Al^{3+}$, $Fe^{3+}$, $Sb^{3+}$, $Yb^{3+}$, $Dy^{3+}$ or $Er^{3+}$ and $0.01 \leq x \leq 3$, which composite is characterized by the steps of a) crushing $Na_2CO_3$, $SiO_2$, $NH_4H_2PO_4$, a source of zirconium and a doping agent in a ball mill in order to prepare a ground powder, b) calcining the ground powder in order to prepare a calcined powder, and c) sintering the calcined powder in order to prepare a solid-state electrolyte.

US 2014/0197351 A1 describes a lithium-ion-conducting ceramic material, in which the powdery precursor material is first calcined, then ground and then sintered.

US 2015/0099188 A1 discloses a method for preparing a thin film, comprising a lithium-ion-conducting garnet material, in which a reaction mixture of garnet precursors and optionally a lithium source is applied to a substrate as a mixture or a slip and subsequently sintered, the garnet precursors reacting to form a thin, lithium-enriched film.

The alternative preparation approach by means of sol-gel synthesis, which approach is also known, occurs at the molecular level or on a nanometer basis, and accordingly consistently results in very homogenous materials.

However, this type of preparation generally requires complex, and therefore usually expensive, starting materials, as well as organic solvents and heating apparatuses.

These circumstances mean that, overall, this alternative preparation method is an expensive and time-consuming method which is usually profitable only for small ranges of application.

SUMMARY

In an embodiment, the present invention provides a method for preparing electrolyte material having a NASICON structure, based on a $Na_{3+x}Sc_xZr_{2-x}(SiO_4)_2(PO_4)$ compound where $0 \leq x < 2$. The method includes providing an acidic, aqueous solution which, according to a desired stoichiometry, comprises sodium, scandium and zirconium in the form of water-soluble nitrates, acetates or carbonates, and soluble silicates or orthosilicic acids or organic silicon compounds in dissolved form; subsequently adding phosphoric acid or ammonium dihydrogenphosphate or other soluble phosphates, according to the desired stoichiometry, complex zirconium dioxide phosphates forming as colloidal precipitations; and subsequently drying and calcining the mixture.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
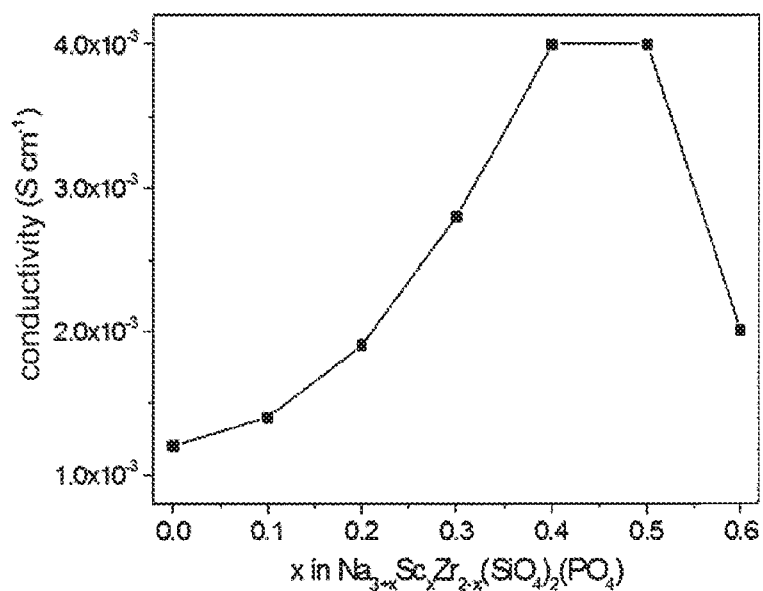
FIG. 1 shows the ionic conductivity, at room temperature of 25° C., of $Na_3Sc_xZr_{2-x}(SiO_4)_2(PO_4)$ compounds where x is in the range of from 0 to 0.6.

One or more embodiments of the present invention provide alternative, phase-pure materials having a NASICON structure, which materials have a sodium ion conductivity of at least $1 \cdot 10^{-3}$ S/cm at room temperature of 25° C.

One or more embodiments of the invention provide a cost-effective and simple method for preparing these materials, which method is also suitable for large-scale preparation.

Embodiments of the invention provide materials based on $Na_2Zr_2(SiO_4)_2(PO_4)$ compounds and having a very high sodium ion conductivity, which materials can in particular be used as solid-state electrolytes for Na batteries, as sensors or in general as electrochemical components.

The materials provided according to the embodiments of the invention include sodium scandium zirconium silicate phosphates $(Na_{3+x}Sc_xZr_{2-x}(SiO_4)_2(PO_4))$ where $0 \leq x < 2$, which materials consistently exhibit a conductivity of more than $1 \cdot 10^{-3}$ S/cm, advantageously even more than $3 \cdot 10^{-3}$ S/cm, at room temperature of 25° C.

Within the context of this invention, the term "conductivity" is always understood to mean the ionic conductivity.

Embodiments of the invention additionally provide methods for preparing the above-mentioned materials that are simple and cost-effective, while simultaneously being easy to control.

In order to prepare the materials according to embodiments of the invention, trivalent scandium ions can advantageously be used for the partial substitution of $Na_3Zr_2(SiO_4)_2(PO_4)$, in absolute terms, a zirconium ion having oxidation number +IV being substituted by a scandium ion having oxidation number +III and by a further sodium ion.

Of all trivalent metal cations ($M^{3+}$) that are theoretically possible for a substitution, for example $Al^{3+}$, $Sc^{3+}$ or $Y^{3+}$, the ionic radius of $SC^{3+}$, at 74.5 pm, is very similar to the ionic radius of $Zr^{4+}$, at 72 pm.

This means that substituting the zirconium with scandium advantageously only leads to a deficit in the positive charge, and this substitution does not disadvantageously also lead to more significant disorder in the crystal structure.

Within the context of the invention, a method for preparing the above-mentioned material according to the invention is provided.

This is a solvent-assisted solid-state reaction method, in which only inexpensive starting materials can be used, and in which only simple laboratory equipment is required.

The preparation method according to the invention can, in addition, be easily scaled to large preparation quantities.

Synthesis is thus possible both on a laboratory scale, in the range of from 10 to 1000 g, and on a large scale, up to quantities in tons.

During the preparation according to the invention of the sodium ion-conducting materials according to the invention, firstly an acidic, aqueous solution is provided, to which the corresponding starting chemicals are added at the preferred stoichiometry.

For example, nitrates, acetates or carbonates of sodium, zirconium and scandium, soluble silicates or orthosilicic acid or organic silicon compounds, phosphoric acid or ammonium dihydrogenphosphate or other phosphates can be used as starting materials.

In principle, all water-soluble salts or acids of the corresponding elements (scandium, sodium, zirconium, silicon and phosphorus) which decompose during a subsequent combustion process (calcining) and to not leave behind any other impurities are suitable.

In this case, the wide selection of suitable starting materials is a further advantage of this invention.

When preparing the sodium ion-conducting materials according to the invention, it is important for the phosphorus component, for example in the form of phosphoric acid or ammonium dihydrogenphosphate, to be added to the aqueous system as a final method step.

When the phosphorus component is added, the initially homogenous aqueous system consistently immediately changes, due to the formation of complex zirconium dioxide phosphates, into an aqueous mixture comprising colloidal precipitations.

Since precipitations form during this final method step, the preparation method according to the invention is therefore not a sol-gel synthesis.

In contrast with a sol, in the mixture according to the invention there is no longer any homogeneity in the system at this time.

At the same time, however, it is not a solid-state reaction either, as has hitherto been described as a method for preparing NASICON-like structures.

The aqueous mixture prepared according to the invention and comprising the colloidal precipitations is subsequently dried over a long period of time, the liquid components of the mixture evaporating.

This can occur in a time period of from 12 to 24 hours and at temperatures of between 60° C. and 120° C. for example.

The remaining solid is subsequently combusted (calcined).

This can occur in a time period of from 2 to 12 hours and at temperatures of between 700° C. and 900° C. for example, a white powder being obtained.

Although, on account of precipitations, the mixing of the starting materials does not take place at the molecular level or on the nanometer scale in the preparation method according to the invention, it has surprisingly been found that the calcined powder has a particle size in the region of approximately 0.1 μm.

Therefore, the particle size of the powder prepared by the method according to the invention is significantly smaller than the particle size of the powders that have hitherto been prepared by the conventional solid phase reaction method, although this latter method in particular promotes homogenization during mixing and subsequent grinding.

Moreover, it can be concluded from testing the white powder that the powder is also present in an agglomerated form at least in part.

In the preparation method according to the invention, the amount of synthesized powder is predominantly dependent only on the size of the drying apparatus and the sintering device.

Even using a conventional drying cupboard and a laboratory oven, approximately 1 kg can be prepared without problem.

Therefore, the preparation method according to the invention is, however, also significantly more advantageous than the alternative sol-gel method known from the prior art.

The powder is usually ground following calcining.

A ball mill in particular is suitable for this purpose.

For example, the calcined powder can be ground in ethanol, propanol, butanol, acetone or another organic solvent, in a ball mill comprising zirconia balls, over a time period of from 24 to 96 hours.

After the now ground and combusted powder has been dried again, said powder can now be compressed to form a high-density ceramic.

For example, the powder was first uniaxially compressed at room temperature and at a pressure of between 50 and 100 MPa, and subsequently sintered for a time period of between 5 and 12 hours and at temperatures of between 1200° C. and 1300° C.

Examination in an X-ray diffractometer (XRD) revealed that the densely sintered samples did not contain any foreign phases. In this case, the density of the tested samples even reached over 95% of the theoretical density.

The method according to the invention set out is theoretically suitable for preparing a plurality of compounds based on a $Na_3Zr_2(SiO_4)_2(PO_4)_3$ compound, which compounds are capable of forming a NASICON structure and, in this case, have the following general formula: $M^I_{1+2w+x-y+z} M^{II}_w M^{III}_x Zr^{IV}_{2-w-x-y} M^V_y (SiO_4)_2 (PO_4)_{3-z}$ Where $M^I$=sodium or lithium, and $M^{II}$, $M^{III}$, $M^V$=in each case a suitable divalent, trivalent or pentavalent metal cation, and where $0 \leq x < 2$, $\leq y < 2$, $0 \leq z < 3$ and $\leq w < 2$.

In this case, the roman numerals I, II, III, IV or V specify the oxidation number in which the relevant metal cations are present in the compound.

Very generally, the preparation process set out can be used for preparing any ceramic compound provided that the starting materials can be dissolved in a single solvent system.

$Mg^{2+}$, $Ca^{2+}$, $Sr^{2+}$, $Ba^{2+}$, $Co^{2+}$ or $Ni^{2+}$, for example, could be selected as the divalent metal cations ($M^{II}$).

Suitable trivalent metal cations ($M^{III}$) would be: $Al^{3+}$, $Ga^{3+}$, $Sc^{3+}$, $La^{3+}$, $Y^{3+}$, $Gd^{3+}$, $Sm^{3+}$, $Lu^{3+}$, $Fe^{3+}$ or $Cr^{3+}$.

Suitable pentavalent metal cations ($M^V$) would be: $V^{5+}$, $Nb^{5+}$ or $Ta^{5+}$.

One or more embodiments of the invention provide for the preparation of compounds of this kind, in which the zirconium is advantageously at least partially substituted by scandium and also sodium, i.e. focuses on the preparation of compounds of the type:

$Na_{3+x}Sc_xZr_{2-x}(SiO_4)_z(PO_4)_{z-3}$ where $0 \leq x < 2$.

NASICON structures partially substituted with scandium are known from M. A. Subramanian et al., J. Solid State Chem., Vol. 60, pp. 172-181, 1985.

However, conductivities in the region of approximately $5.0 \cdot 10^{-4}$ S/cm at room temperature are specified for said compounds, which conductivities would be insufficient for use as a solid-state electrolyte for Na batteries.

Within the context of the invention, sodium ion-conducting materials based on $(Na_{3+x}Sc_xZr_{2-x}(SiO_4)_2(PO_4))$ where $0 \leq x < 2$ can now be provided by means of the method according to the invention.

In particular, at room temperature of 25° C. and in the range where $0 \leq x \leq 0.6$, said compounds consistently have a conductivity of more than $1 \cdot 10^{-3}$ S/cm, as is also shown in FIG. 1.

However, as a result, said materials are preferably suitable as sodium ion-conductors for use in an electrochemical cell.

By varying the substitution, i.e. by varying the value of x, it has additionally been possible to prepare materials in which even conductivities of above $3 \cdot 10^{-3}$ S/cm have been measured at room temperature of 25° C.

At room temperature (25° C.) and in the range where $0 \leq x \leq 0.6$, the material prepared and sintered according to the invention $(Na_{3+x}Sc_xZr_{2-x}(SiO_4)_z(PO_4)_{z-3})$ has a total conductivity of between $1.0 \cdot 10^{-3}$ S/cm and $4.0 \cdot 10^{-3}$ S/cm, the conductivity initially increasing as the scandium content increases, and then decreasing again above x=0.5

The initial increase may be due to the fact that, each time a zirconium ion is substituted with a scandium ion, a further sodium ion is in addition also required in order to compensate the lack of a positive charge caused by replacing zirconium with scandium.

The increase in the ionic conductivity has not yet been ultimately explained.

It is possible to assume, however, that, in the case of NASICON compounds, there is an optimal range of between 0.4 and 0.5 for the ratio of positions occupied by and free of sodium ions.

Even the unsubstituted $Na_2Zr_2(SiO_4)_2(PO_4)$ compound prepared according to the invention already has a high ionic total conductivity of approximately $1.2 \cdot 10^{-3}$ S/cm at room temperature.

Said measured value is twice as high as the previously disclosed values for this compound in H. Y-P. Hong et al, Mat. Res. Bull. Vol. 11, pp. 173-182, 1976 and Ignaszak et al., Thermochim. Acta., Vol. 426, pp. 7-14, 2005.

The partially substituted $Na_{3.4}Sc_{0.4}Zr_{1.6}(SiO_4)_2(PO_4)$ and $Na_{3.5}Sc_{0.5}Zr_{1.5}(SiO_4)_2(PO_4)$ each exhibit conductivities of approximately $4.0 \cdot 10^{-3}$ S/cm at room temperature, which is one order of magnitude greater than the previously disclosed values for scandium-substituted $Na_2Zr_2(SiO_4)_2(PO_4)$ from J. L. Briant et al., J. Solid State Chem., Vol. 33, pp. 385-390, 1980.

It is likely that these high conductivity values result from the homogenous mixing of the starting materials at the beginning of the preparation method according to the invention.

Table 1 compares the conductivity values of two compounds prepared within the context of this invention ($Na_{3.4}Sc_{0.4}Zr_{1.6}(SiO_4)_2(PO_4)$ and $Na_{3.5}Sc_{0.5}Zr_{1.5}(SiO_4)_2(PO_4)$) with other solid phase sodium or lithium ion-conductors which also have high ionic conductivity values.

The measured values in each case apply for a room temperature of 25° C.

Both ß/ß"-aluminum single crystals as a sodium ion conductor, and $Li_{10}GeP_2S_{12}$ as a lithium ion conductor exhibit higher conductivity values than the compounds prepared according to the invention.

However, ß/ß"-aluminum single crystals are relatively unlikely to be used for a large-scale application for the reasons mentioned above.

Using $Li_{10}GeP_2S_{12}$ as a lithium ion conductor is also disadvantageous on account of said material being sensitive to air and unstable in relation to contact with metal lithium.

In contrast, on account of their high conductivity values, the compounds, prepared within the context of this invention, of the type $Na_{3+x}Sc_xZr_{2-x}(SiO_4)_2(PO_4)_{z-3}$, where $0 \le x < 2$, in particular in the range of $0.35 < x < 0.55$, and particularly advantageously in the range between $0.4 \le x \le 0.5$ (e.g. $Na_{3.4}Sc_{0.4}Zr_{1.6}(SiO_4)_2(PO_4)$) and $Na_{3.5}Sc_{0.5}Zr_{1.5}(SiO_4)_2(PO_4)$), have considerable potential for use in large-scale applications, since said compounds are chemically and mechanically stable, are light-weight and can be prepared on a large scale, and the conductivities thereof are also sufficiently high for the above-mentioned applications.

In our view, the partially scandium-substituted $Na_2Zr_2(SiO_4)_2(PO_4)$ compounds prepared within the context of this invention have the highest ionic conductivity values, at room temperature (25° C.), that have ever been published for compounds having a NASICON structure.

The conductivities of said compounds are even 2-3 times higher than most laboriously developed ß/ß" aluminum polycrystals as sodium ion conductors, and also higher than the lithium ion conductors based on $Li_7Zr_2La_3O_{12}$.

Therefore, on account of their excellent electrical properties, their inexpensive preparation, and the possibility of large-scale preparation, said compounds according to the invention are extremely suitable for being used commercially.

TABLE 1

Comparison of the total conductivities at room temperature (25° C.) for embodiments of this invention and further solid phase sodium ion conductors and solid phase lithium ion conductors known from the prior art.

| | Materials | Total conductivity at 25° C. [S/cm] | Reference |
|---|---|---|---|
| Sodium ion conductor | $Na_{3.4}Sc_{0.4}Zr_{1.6}(SiO_4)_2(PO_4)$ and $Na_{3.5}Sc_{0.5}Zr_{1.5}(SiO_4)_2(PO_4)$ | $4.0 \cdot 10^{-3}$ | this invention |
| | β/β" aluminum single crystals | $3.0 \cdot 10^{-2}$ | [4] |
| | unspecifically partially substituted compound based on $Na_{1+x}Zr_2(SiO_4)_x(PO_4)_{3-x}$ | $3.5 \cdot 10^{-3}$ | US 2010/0297537 A1 |
| | $Na_{3.2}Hf_2Si_{2.2}P_{0.8}O_{12}$ | $2.3 \cdot 10^{-3}$ | E. M. Vogel et al., Solid State Ionics, Vol. 14, pp. 1-6, 1984 |
| | $Na_4ZrAl(SiO_4)_2(PO_4)$ | $1.9 \cdot 10^{-2}$ | WO 2014/052439 A1 |
| | β/β" aluminum poly crystals | 1 to $2 \cdot 10^{-3}$ | J. W. Fergus, Solid State Ionics, Vol. 227, pp. 102-122, 2012 |
| Lithium ion conductor | $Li_{10}GeP_2S_{12}$ | $1.0 \cdot 10^{-2}$ | N. Kamaya et al., Nat. Mater., Vol. 10, pp. 682-686, 2011 |
| | $Li_{1+x}Al_xTi_{2-x}P_3S_{12}$ where x ???? | $1.3 \cdot 10^{-3}$ | J. Fu et al., Solid State Ionics, Vol 96, pp. 195-200, 1997 |
| | $Li_3Zr_2Li_{0.55}Ga_{0.15}O_{12}$ | $1.3 \cdot 10^{-3}$ | C. Bernuy-Lopez et al., Chem. Mater., Vol. 26, pp. 3610-3617, 2014 |

Using the $Na_{3+x}Sc_xZr_{2-x}(SiO_4)_2(PO_4)$ powders, where $0 \leq x < 2$, which powders can be prepared according to the invention, it is in addition possible to prepare dense $Na_{3+x}Sc_xZr_{2-x}(SiO_4)_2(PO_4)$ substrates by means of tape casting, or to apply dense $Na_{3+x}Sc_xZr_{2-x}(SiO_4)_2(PO_4)$ layers to other substrates by means of screen printing, which substrates are required for the further production of solid-state sodium ion batteries.

At a density that is consistently more than 90% of the theoretical density, the $Na_{3+x}Sc_xZr_{2-x}(SiO_4)_2(PO_4)$ compounds that can be prepared according to the invention are advantageously suitable, on account of the good conductivity values thereof, for use as solid electrolyte membranes in solid-state batteries.

Preparation of 13.03 g (0.025 Mol) $Na_{3.4}Sc_{0.4}Zr_{1.6}(SiO_4)_2(PO_4)$ Powder 9.249 g $ZrO(NO_3)_2$, 6.374 g $NaNO_3$ and 2.310 g $Sc(NO_3)_3$ were dissolved, by stirring, in 100 ml deionized water.

After all the salts had dissolved, 10.417 g tetraethyl orthosilicate was added and the mixture was stirred again.

In order to accelerate the hydrolysis of the tetraethyl orthosilicate, a further 2 ml $HNO_3$ (65 wt. %) was added to the system.

After the tetraethyl orthosilicate had fully hydrolyzed, 2.8769 g $NH_4H_2PO_4$ was added, again while stirring.

When the phosphate was added, the hitherto homogenous aqueous system changed to a mixture that then comprised colloidal precipitations of complex zirconium oxide-phosphate compounds.

The mixture comprising the colloidal precipitations was subsequently dried at 90° C. for approximately 12 hours.

The dried powder was then calcined at 800° C. for approximately 3 hours.

Following the combustion process, a white powder was obtained which was subsequently ground for a further 48 hours in a ball mill using zirconia balls and ethanol.

Preparation of Dense Tablets Comprising $Na_{3.4}Sc_{0.4}Zr_{1.6}(SiO_4)_2(PO_4)$ 1 g of the white ground powder prepared according to embodiment 1 was transferred into a cylindrical interference fit having a diameter of 13 mm, and compressed at room temperature and at a uniaxial pressure of 100 MPa.

The tablets thus compressed were subsequently sintered at 1260° C. for approximately 6 hours.

Pure, white tablets were obtained.

The density of said sintered tablets reached over 95% of the theoretical density.

Figure 2:
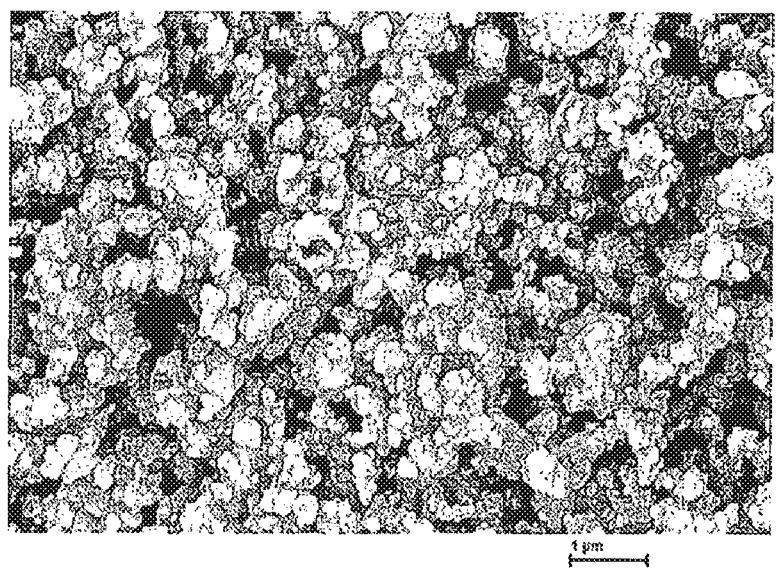
FIG. 2 shows the microstructure of the $Na_{3.4}Sc_{0.4}Zr_{1.6}(SiO_4)_2(PO_4)$ powder prepared according to an embodiment of the invention, following calcining and grinding in a ball mill.

Tests using a Siemens D4 X-ray diffractometer (XRD) having Cu Kα radiation did not reveal any additional phases in these tablets apart from the desired monoclinic crystal structure, as shown in FIG. 2.

The crystallographic standard (JCPDS: 01-078-1041) was used as a reference and is also shown in FIG. 2.

Tests of the total conductivity of dense tablets comprising $Na_{3.4}Sc_{0.4}Zr_{1.6}(SiO_4)_2(PO_4)$ Both flat sides of the dense, white compressed $Na_{3.4}Sc_{0.4}Zr_{1.6}(SiO_4)_2(PO_4)$ tablets prepared according to embodiment 2 were coated with gold.

At temperatures of between −20° C. and 100° C., impedance spectra having an AC frequency of between 7 MHz and 1 Hz were recorded for the compressed and sintered tablets, using a conventional electrochemical system (Biologic VMP-300).

Ion transport processes in solids can be studied using impedance spectroscopy.

Impedance spectroscopy measurements are comparatively simple to carry out but nonetheless provide precise conductivity results.

For comparison purposes, some of the compounds prepared according to the invention were alternatively also synthesized in accordance with the Pechini method (U.S. Pat. No. 3,330,697).

This process resembles sol-gel preparation.

An aqueous solution of corresponding oxides or salts is mixed with an α-hydroxy carboxylic acid, for example citric acid.

In the process, chelate formation or the formation of complex ring compounds around the metal cations occurs in the solution.

A polyhydroxy alcohol is added, and the entire mixture is heated to temperatures of between 150 and 250° C., as a result of which the chelates polymerize or form large bonded networks.

The excess water is removed by heating, such that a solid polymer resin is formed.

At even higher temperatures of between 500 and 900° C., the polymer resin decomposes or combusts, as a result of which a mixed oxide is ultimately obtained.

The compounds have small particle sizes of between 0.5 and 1 μm as a result of the mixing at the atomic level, larger agglomerates also forming, however.

TABLE 2

Comparison of the ionic conductivities, at room temperature (25° C.), of samples produced in one case according to the invention and alternatively according to the Pechini method

| x in $Na_{3+x}Sc_xZr_{2-x}(SiO_4)_2(PO_4)_3$ | Ionic conductivity for samples according to the invention [S/cm] | Ionic conductivity for samples prepared according to the Pechini method [S/cm] |
|---|---|---|
| 0 | $1.2 \cdot 10^{-3}$ | $9.5 \cdot 10^{-4}$ |
| 0.1 | $1.4 \cdot 10^{-3}$ | — |
| 0.2 | $1.9 \cdot 10^{-3}$ | — |
| 0.3 | $2.8 \cdot 10^{-3}$ | $2.1 \cdot 10^{-3}$ |
| 0.4 | $4.0 \cdot 10^{-3}$ | $3.0 \cdot 10^{-3}$ |
| 0.5 | $4.0 \cdot 10^{-3}$ | $1.8 \cdot 10^{-3}$ |
| 0.6 | $2.0 \cdot 10^{-3}$ | — |

Figure 3:
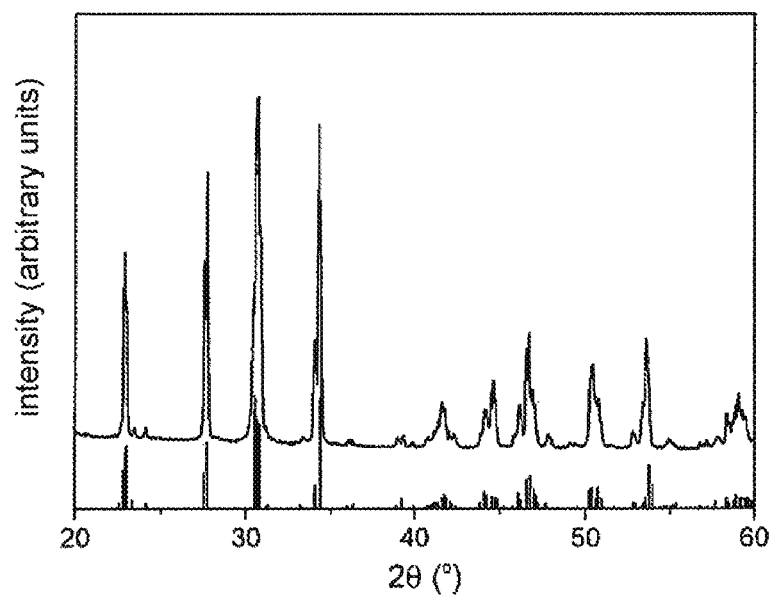
FIG. 3 shows tests using the X-ray diffractometer (XRD) on the $Na_{3.4}Sc_{0.4}Zr_{1.6}(SiO_4)_2(PO_4)$ compound prepared according to an embodiment of the invention, in which the crystallographic standard (JCPDS: 01-078-1041) is also shown as a reference.
Figure 4:
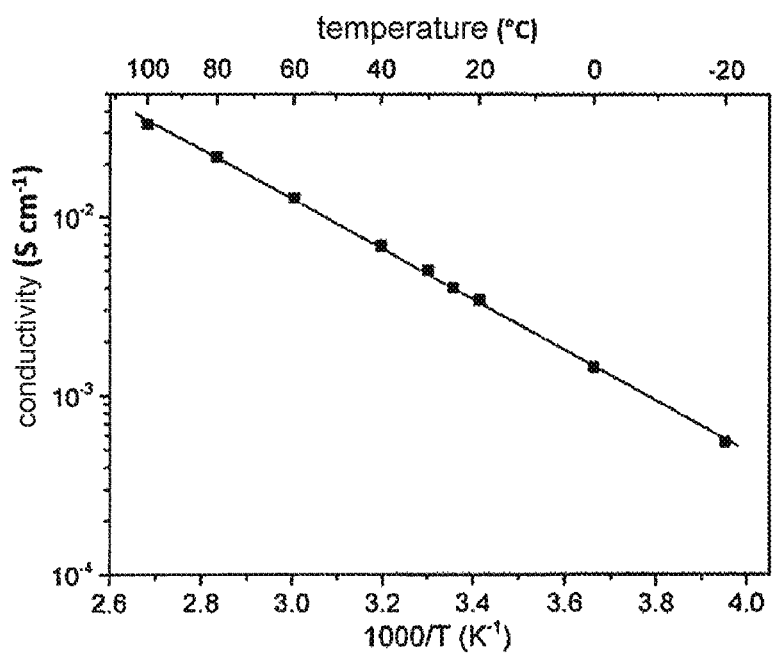
FIG. 4 shows the temperature-dependency of the ionic total conductivity of the $Na_{3.4}Sc_{0.4}Zr_{1.6}(SiO_4)_2(PO_4)$ compound prepared according to an embodiment of the invention.

The results for the compounds prepared according to the invention are shown in FIG. 3.

At room temperature, a total conductivity of approximately $4.0 \cdot 10^{-3}$ S/cm was determined for the $Na_{3.4}Sc_{0.4}Zr_{1.6}(SiO_4)_2(PO_4)$ tablets according to the invention.

Comparison with the compounds prepared in an alternative manner using the sol-gel procedure reveals that the method according to the invention leads to significantly improved conductivity values that are sometimes even around 20% higher.

It is likely that the homogenous mixing at the start and the very small particle sizes of the powder thus obtained advantageously lead to these high ionic conductivity values.

It should be noted that the measurement of the ionic conductivity also depends on the density of the prepared tablets.

When the tablets have a low density, the pores present would distort the result.

It is assumed that, in the case of samples having a density of over 90% of the theoretical density it is possible to assume that the measured conductivity can be equated to the ionic total conductivity, in particular when the samples have a density of over 95% of the theoretical density.

Preparation of 1000 g (1.910 mol) $Na_{3.3}Sc_{0.3}Zr_{1.7}(SiO_4)_2(PO_4)$ Powder 750.8 g $ZrO(NO_3)_2$, 334.0 g $NaNO_3$ and 39.51 g $Sc_2O_3$ were dissolved, by stirring, in 6 liters of deionized water.

After all the salts had dissolved, 1010 g tetrapropyl orthosilicate was added and the mixture was stirred again.

In order to accelerate the hydrolysis of the tetraethyl orthosilicate, a further 650 ml $HNO_3$ (65 wt. %) was added to the system.

After the tetraethyl orthosilicate had fully hydrolyzed, 252.2 g $(NH_3)_2HPO_4$ was added, again while stirring.

When the phosphate was added, the hitherto homogenous aqueous system changed to a mixture that then comprised colloidal precipitations of complex zirconium oxide-phosphate compounds.

The mixture comprising the colloidal precipitations was subsequently dried at 90° C. for approximately 12 hours and then calcined at 800° C. for approximately 3 hours, similarly to embodiment 1.

Following the combustion process, a white powder was likewise obtained, which powder was subsequently ground for a further 48 hours in a ball mill using zirconia balls and ethanol.

Testing the microstructure of the $Na_{3+x}Sc_xZr_{2-x}(SiO_4)_2(PO_4)_3$ compounds prepared according to the invention and in which 0<x<2 reveal that the calcined powder has a particle size in the region of only approximately 0.1 μm.

The particle size of the powder prepared by means of the method according to the invention is therefore significantly below the particle size of the powders obtained hitherto using the conventional solid phase reaction method.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for preparing electrolyte material having a NASICON structure, based on a $Na_3Zr_2(SiO_4)_z(PO_4)_3$ compound where 0≤x<2, comprising the steps of:
   providing an acidic, aqueous solution which, according to a desired stoichiometry, comprises sodium, scandium and zirconium in the form of water-soluble nitrates, acetates or carbonates, and soluble silicates or orthosilicic acids or organic silicon compounds in dissolved form as starting materials;
   subsequently adding phosphoric acid or ammonium dihydrogenphosphate or other soluble phosphates, according to the desired stoichiometry, thereby forming a mixture having complex zirconium dioxide phosphates as colloidal precipitations; and
   subsequently drying and calcining the mixture.

2. The method according to claim 1, wherein the starting materials are selected according to the stoichiometry for 0≤x<2.

3. The method according to claim 1, wherein the mixture is dried at temperatures of between 60° C. and 120° C.

4. The method according to claim 1, wherein the mixture is calcined at temperatures of between 700° C. and 900° C.

5. The method according to claim 1, wherein, the dried and calcined mixture comprises particles having a particle size, determined using a scanning electron microscope, of approximately 0.1 μm.

6. The method according to claim 1, wherein the dried and calcined mixture is subsequently ground.

7. The method according to claim 6, wherein the dried, calcined and ground mixture is subsequently compressed.

8. The method according to claim 7, wherein the dried, calcined and ground mixture is compressed at pressures of between 50 and 100 MPa.

9. The method according to claim 7, wherein the compressed mixture is sintered at temperatures of between 1200° and 1300° C.

10. A sodium ion-conducting membrane comprising a $Na_3Zr_2(SiO_4)_z(PO_4)_3$ compound where 0.3≤x≤0.6, which can be prepared according to claim 1, having an ionic conductivity of more than $1.2 \cdot 10^{-3}$ S/cm at 25° C.

11. A sodium ion-conducting membrane according to claim 10, having a density of more than 90% of a theoretical density.

12. A sodium ion-conducting membrane comprising a $Na_3Zr_2(SiO_4)_z(PO_4)_3$ compound where 0.3≤x≤0.6, which can be prepared according to claim 1, having an ionic conductivity of more than $3 \cdot 10^{-3}$ S/cm at 25° C.

13. A sodium ion-conducting membrane according to claim 12, having a density of more than 90% of a theoretical density.

* * * * *